(12) United States Patent
Novikau et al.

(10) Patent No.: US 12,737,844 B2
(45) Date of Patent: Sep. 15, 2026

(54) METHOD, APPARATUS AND SOFTWARE PROGRAM FOR INCREASING RESOLUTION IN MICROSCOPY

(71) Applicant: Carl Zeiss Microscopy GmbH, Jena (DE)

(72) Inventors: Yauheni Novikau, Apolda (DE); Volodymyr Kudryavtsev, Jena (DE); Stanislav Kalinin, Weimar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 592 days.

(21) Appl. No.: 18/053,081

(22) Filed: Nov. 7, 2022

(65) Prior Publication Data

US 2023/0143873 A1 May 11, 2023

(30) Foreign Application Priority Data

Nov. 9, 2021 (DE) ........................ 102021129159.3

(51) Int. Cl.
*G06T 3/4076* (2024.01)
*G06T 3/4053* (2024.01)
*G06T 5/50* (2006.01)

(52) U.S. Cl.
CPC .............. *G06T 3/4076* (2013.01); *G06T 5/50* (2013.01); *G06T 2207/10056* (2013.01)

(58) Field of Classification Search
CPC ............................... G06T 3/4076; G06T 5/50; G06T 2207/10056
See application file for complete search history.

(56) References Cited

U.S. PATENT DOCUMENTS

2018/0136360 A1* 5/2018 Ardjmandpour ........ G01V 5/06
2020/0301121 A1* 9/2020 Kalinin ............. G02B 21/0032
2022/0092752 A1 3/2022 Kleppe et al.

FOREIGN PATENT DOCUMENTS

DE 102020123668 A1 3/2022

OTHER PUBLICATIONS

Biggs, David SC, and Mark Andrews. "Acceleration of iterative image restoration algorithms." Applied optics 36.8 (1997): 1766-1775 (Year: 1997).*

(Continued)

*Primary Examiner* — Oneal R Mistry
*Assistant Examiner* — Nhut Huy Pham
(74) *Attorney, Agent, or Firm* — DUANE MORRIS LLP

(57) ABSTRACT

A description is given of a method for increasing resolution in microscopy, comprising providing at least one recorded sample image (22) which was generated by means of a microscope (2), providing a point spread function which characterizes an imaging behaviour of the microscope (2), and calculating a sample image with increased resolution from the recorded sample image (22), wherein the calculating is effected in an iteration process (S4) which repeatedly passes through an iteration loop (S4*a*; S4*b*) and which determines a correction image (24.0-24.*n*) from the recorded sample image (22) using the point spread function, wherein a difference between the correction image convolved with the point spread function and the recorded sample image (22) is minimized in the iteration process (S4), and wherein in the iteration process (S4) the passes through the iteration loop (S4*a*; S4*b*) are numbered with an ascending pass number (k) and each comprise a step size factor which is dependent on the pass number (k) of the respective pass and is determined without recourse to correction images.

9 Claims, 4 Drawing Sheets

(56) References Cited

OTHER PUBLICATIONS

Wang, Xiaoyu, Sindri Magnusson, and Mikael Johansson. "On the convergence of step decay step-size for stochastic optimization." Advances in Neural Information Processing Systems 34 (2021): 14226-14238, published Feb. 18, 2021 (Year: 2021).*

Podilchuk, C. I., and R. J. Mammone. "Step size for the general iterative image recovery algorithm." Optical Engineering 27.9 (1988): 806-811. (Year: 1988).*

Wikipedia, "Logistic function", https://en.wikipedia.org/wiki/Logistic_function, published Aug. 4, 2021 (Year: 2021).*

Jeffrey A. Fessler, "Chapter 11: Optimization by General-Purpose Methods", University of Michigan, published Sep. 29, 2020 (Year: 2020).*

Yuan, Ya-xiang. "Step-sizes for the gradient method." AMS IP Studies in Advanced Mathematics 42.2, published 2008 (Year: 2008).*

Biggs, David SC, and Mark Andrews. "Acceleration of iterative image restoration algorithms." Applied optics 36.8 (1997): 1766-1775 , cited in IDS (Year: 1997).*

Biggs, David SC, and Mark Andrews. "Acceleration of iterative image restoration algorithms." Applied optics 36.8, cited in IDS (Year: 1997).*

Timothy J. Holmes, et al., Acceleration of maximum-likelihood image restoration for fluorescence microscopy and other noncoherent imagery, J. Opt. Soc. Am. A (Jun. 1991) vol. 8, No. 6, p. 893-907.

H. Lanteri, et al., A general method to devise maximum likelihood signal restoration multiplicative algorithms with non-negativity constraints, Signal Processing (2001) 81:945-974.

Pinaki Sarder, et al., Deconvolution Methods for 3-D Fluorescence Microscopy Images, IEEE Signal Processing Magazine (May 1, 2006) vol. 23, No. 3, p. 32-45.

Hongbin Wang, et al., Scaled Heavy-Ball Acceleration of the Richardson-Lucy Algorithm for 3D Microscopy Image Restoration, IEEE Transactions on Image Processing (Feb. 2014) vol. 23, No. 2, p. 848-854.

David S.C. Biggs, et al., Acceleration of Iterative Image Restoration Algorithms, Applied Optics (Mar. 10, 1997) vol. 36, No. 8, p. 1766-1775.

Dr. Maria Ingaramo, et al., Richardson-Lucy deconvolution as a general tool for combining images with complementary strengths, Chemphyschem. (Mar. 17, 2014) vol. 15, No. 4, p. 794-800.

Olivia Prazeres da Costa, et al., Carl Zeiss Microscopy GmbH, Germany, Seeing Beyond: A Practical Guide of Deconvolution (Dec. 2021).

L. H. Schaefer, et al., Generalized approach for accelerated maximum likelihood based image restoration applied to three-dimensional fluorescence microscopy, Journal of Microscopy (Nov. 2001) vol. 204, Pt. 2, p. 99-107.

* cited by examiner start
estimating
convoluting
improved image
S4.24
S4.28
S4.32
S4.26
S4a
S4

28.2
24.2
24.n
30.n
24.1
30.2
30.1
28.1
24.0
32.0
32.1
26.2
32.2
26.n
28.n
32.n
26.1
k=1
k=n
22

METHOD, APPARATUS AND SOFTWARE PROGRAM FOR INCREASING RESOLUTION IN MICROSCOPY

RELATED APPLICATIONS

The present application claims benefit of German Application No. DE 102021129159.3 filed on Nov. 9, 2021, the contents of are incorporated by reference in its entirety.

BACKGROUND OF THE INVENTION

The invention relates to a method, an apparatus and a software program for increasing resolution in microscopy, in particular fluorescence microscopy, wherein an image enhancement by means of an iteration process is employed. In this case, the method comprises the following steps: providing at least one recorded sample image which was generated by means of a microscope, providing a point spread function which characterizes an imaging behaviour of the microscope, and calculating a sample image with increased resolution from the recorded sample image, wherein the calculating is effected in an iteration process which repeatedly passes through an iteration loop and which determines a correction image from the recorded sample image using the point spread function, wherein a difference between the correction image convolved with the point spread function and the recorded sample image is minimized in the iteration process.

In modern microscopy, in particular wide field fluorescence microscopy, it has been known for a relatively long time that image processing enables the resolution to be increased by comparison with the imaging that can be achieved by means of the microscope. The imaging performance of the microscope is limited by optical laws, in particular the Abbe diffraction criterion, and also further noise processes during image recording, or in detectors, etc. Various image processing methods allow the resolution on the image nevertheless to be increased and the sample image with increased resolution to be determined from the original sample image. Maximum likelihood-based algorithms with an iterative mode of operation are of particular interest here because their performance is particularly high. They all start from the insight that the point spread function is an essential characterization of the microscope. This describes how the image of a point-like emitter is no longer perceived as a point on the detector, but rather usually as a small disc. The resolution-reducing properties of the microscope are therefore generally described by the point spread function (abbreviated to PSF). In the case of a customary wide field microscope, the PSF is formed in the shape of a double cone which resembles an hourglass and has its narrowest waist in the focal plane and also extends perpendicularly thereto along the optical axis of the microscope.

From a mathematical standpoint, the imaging in the microscope is a convolution of the intensity distribution, for example of a fluorescent dye, in the sample by means of the point spread function. A background level is additionally involved and the result obtained is noisy in accordance with a microscope-dependent noise function. These processes together then bring about the perceived image having a lower resolution by comparison with the original intensity distribution in the sample. The increase in resolution is achieved by back-calculating these processes. This is referred to as deconvolution in the literature. An exact analytical back-calculation is not possible, however, since the original intensity distribution in the sample cannot simply be deduced from the noisy image owing to the statistical nature of the interacting processes. Image enhancement processes are known. Reference should be made to the so-called Richardson-Lucy algorithm, in particular, which was developed back in the 1970s. This approach, referred to hereinafter as RL algorithm, determines the correction image iteratively such that a convolution of the correction image with the point spread function and taking account of noise processes is as far as possible identical to the recorded sample image obtained by the microscope. The correction image is gradually improved in each pass through the iteration loop characterizing the iteration process, i.e. the difference between the noisy correction image convolved with the point spread function and the recorded sample image decreases more and more. In the original publications, the criterion of maximum likelihood is used as optimization, i.e. for quantification. This procedure has the disadvantage, however, that a very large number of passes, namely 1000 iteration passes or more, are required.

Iteratively accelerated methods that develop the RL algorithm have therefore been developed in the prior art. In this respect, reference should be made to the publications by L. Schaefer et al., Journal of Microscopy, Vol. 204, Pt. 2, November 2001, pages 99-107, and to the publication by D. Biggs and M. Andrews, Applied Optics, Vol. 36, No. 6, March 1997, pages 1766-1775, and furthermore to M. Ingaramo et al., PhysChem, Vol. 15, 2014, pages 794-800. The invention builds on such accelerated methods that perform an optimization according to specific criteria, e.g. maximum likelihood or entropy. The publication by Schaefer et al. proposes carrying out a conjugate gradient method in order to find iteratively faster in an RL algorithm that correction image which, when convolved with the point spread function, and taking account of noise processes, such as Poisson noise or Gaussian noise, for example, corresponds as far as possible to the recorded sample image. In that case, a gradient vector and a Hessian matrix defining a gradient vector length are calculated in each pass. The gradient vector calculation and also the matrix evaluation require a plurality of convolution operations with the point spread function.

The publication by Biggs and Andrews carries out an extrapolation for a correction image obtained in accordance with the RL algorithm, by which extrapolation the change that led to the current correction image in the previous pass is continued over a certain extrapolation size. The extrapolation range is based on a step size factor that is greater than 0 and less than 1 in the algorithm by Biggs and Andrews. Using this factor, the change that led to the current correction image in the previous pass is continued in an estimation step. The step size factor denotes the proportion by which the previous change is extrapolated. This factor is calculated by way of summations of previous correction images, that is to say requires previous correction image data, which have to be stored and are based on convolutions with the point spread function. The estimated correction image is the basis for the calculation of the next correction image in accordance with the RL algorithm. A convolution then takes place during this calculation, with the point spread function having an influence. The method is accelerated by the estimation steps.

The prior art thus achieves an acceleration of the method since the number of necessary passes is reduced, but in return requires relatively complex calculations and image storages. Nevertheless, the calculation is drastically accelerated overall by these approaches, since the number of passes is at least halved.

SUMMARY OF THE INVENTION

Against the background of this prior art, the invention is based on the object of further accelerating the calculation of the sample image with increased resolution.

The invention is characterized in the annexed independent claims The dependent claims relate to preferred developments.

In the method for increasing resolution, a recorded sample image which was generated by means of a microscope is provided. This preferably involves a fluorescence image, which was furthermore optionally recorded as a wide image. Furthermore, the point spread function is provided which, as mentioned, characterizes the imaging behaviour of the microscope. On this basis, a sample image with increased resolution is calculated from the recorded sample image, wherein an iteration process is carried out which determines a correction image from the recorded sample image using the point spread function. On account of the iterative property, this correction image is improved during each pass through the iteration loop, preferably in a maximum likelihood-based manner.

In this context, it is of importance that the resolution of a microscope does not automatically correspond to the number of image pixels of the detector used. Rather, resolution is understood in the optical sense to mean the distance between two points which can still just be differentiated in the sample image. Even arbitrarily increasing the number of pixels on the part of the detector would not result in any change to this measure. Nevertheless, for the optimum subsequent increase in resolution by means of the methods described here, it is advantageous, of course, if use is made of a detector which realizes at least double sampling in accordance with the Nyquist theorem.

The iteration process minimizes a difference between the recorded sample image and the correction image across the passes through the iteration loop if this is convolved with the point spread function and optionally extended by noise terms. The iteration process comprises a multiplicity of passes through the iteration loop, wherein each pass is numbered with a pass number consecutively, i.e. in the sense of a counting index. A step size factor used in the iteration loop is dependent, then, on the pass number of the respective pass. In the iteration loop, the step size factor is multiplied by a change which was attained in the iteration process earlier and with evaluation of a correction image determined earlier or a variable calculated earlier with respect thereto. The step size factor defines a specification of the proportion in which a change in the correction image or the variable, said change being determined with evaluation of the correction image, is continued. For determining the step size factor, provision is no longer made for evaluating a correction image or, in particular, performing a convolution with the point spread function. Consequently, the method is accelerated further since the storage and computational complexity is lower because complex processes are omitted. A non-constant step size factor is nevertheless used in the passes, i.e. the number of passes is still reduced by comparison with the non-accelerated methods of the prior art, which passes can now be carried out faster by comparison with the known accelerated methods.

Particularly preferably, the step size factor is chosen in accordance with a function which is dependent on the pass number and which converges towards one as the pass number rises. This function is always positive, i.e. yields values greater than zero, which thus lie between zero and one owing to the convergence behaviour. The exact function can be ascertained experimentally in a surprisingly simple manner by a procedure in which, in an accelerated method in accordance with the prior art, for example disclosed by Biggs and Andrews or by Schaefer et al., for a plurality of experimental sample images, the behaviour of the step size factor is plotted over the iteration process, i.e. over the number of passes, and the curve being obtained is approximated by a suitable function. In this way, the behaviour of the step size factor, which in the prior art results from the extensive calculations and with recourse to correction images that are to be extensively stored, can be simulated by a simple function. One possible function is $k/(k+x)$, for example, wherein k is the pass number and x is chosen from the interval of one to five. In this context, the calculation step size decreases as the duration of the iteration process increases. In this way, in a surprisingly simple manner, it is possible to simulate the behaviour of the calculation step size that is to be calculated in a complex manner in the conjugate gradient process or in the accelerated RL process, without the need for complex calculations. The simulation has proved to be particularly good if the factor x lies in the interval [2.5; 3.5], particularly preferably being approximately 3. Another possibility is an exponential function dependent on $(-k)$.

In the case of the iteration process by means of a conjugate gradient method, as proposed by Schaefer et al., the step size factor relates to the gradient vector length along which the calculated gradient vector is followed in order to find the starting point for the next gradient vector calculation. In this case there are alternatives. In a first alternative, for each calculation step of the conjugate gradient method, a gradient vector is calculated, and the gradient vector length along which the calculated gradient vector is followed is calculated on the basis of the correction image data, for example by evaluation of the Hessian matrix, only for some passes and is calculated for other passes, for example every second pass, by applying the step size factor to the gradient vector length determined last with evaluation of the correction images. The step size factor thus continues the gradient vector length calculated on the basis of the correction image data. By contrast, the gradient vector is calculated individually for each pass, i.e. also for those passes in which the pass number-based step size factor is employed. In a second alternative thereto, that gradient vector which resulted during the last calculation of the gradient vector length on the basis of the correction image is combined with the use of the step size factor. Consequently, not only is the gradient vector length continued with the step size factor, but also use is made of the same gradient vector as previously during the calculation on the basis of the correction image. The method in general nevertheless converges, but is significantly accelerated in both alternatives, since not only the length calculation along which the gradient vector must be followed.

In the case of the accelerated RL algorithm as described by Biggs and Andrews, for example, the step size factor is used during the calculation of an estimated correction image. The passes each carry out a sequence of an estimation step, which calculates an estimated correction image from the current correction image by means of the step size factor, and a convolution step, which calculates the improved correction image of the current pass from the estimated correction image using the point spread function. Proceeding from the current correction image of the respective pass, a correction image change brought about by the convolution step of the previous pass is thus extrapolated, preferably linearly. The step size factor is applied here, which continues the change brought about by the convolution step of the previous pass. In the case of a step size factor having a value of between zero and one, the proportion by which the last correction image change is extrapolated is thus defined. In other words, the change implemented in the convolution step of the previous pass is continued and extrapolated in the estimation step in order to obtain the basis for the next convolution step.

The pass number is used for the calculation of the step size factor. Recourse to previous correction images is not necessary—nor is there any need for convolution operations or recourse to the point spread function. This further accelerates the known accelerated methods.

A further advantage is afforded in the case of the accelerated RL algorithm because the step size factor calculation, e.g. in accordance with equation (10) from Biggs and Andrews, may also lead to negative step size factors. In this case, Biggs and Andrews set the step size factor to zero, as a result of which, according to what is stated in the publication, the acceleration process is ended and has to start to run anew from the beginning again. This is critical particularly in the case of noisy images since this stopping and renewed beginning may then occur frequently. The method is indeed stable as a result, but slow. The calculation of the step size factor proceeding from the pass number can now ensure in a very simple manner that negative step size factors cannot arise at all. The acceleration process is thus carried out throughout, which shortens the method further since now the number of passes is reduced as well.

The use of the k-based step size factor is preferably implemented alternately with a calculation of the image change on the basis of the last correction image. In the case of the optimization method according to conjugate gradients, for example, every m-th step (m=2, 3, 4, . . . ) is carried out with the k-based calculation of the step size factor. This ensures that the gradient vector length is calculated on the basis of the correction image, e.g. with evaluation of the Hessian matrix, in a sufficient number. This ensures a good convergence of the method even in the case of very noisy images. In the accelerated RL approach, every second calculation is effected on the basis of the correction images whenever a convolution step is carried out after each estimation step. Other frequencies are possible here, too, e.g. one estimation step every 3, 4 or 5 convolution steps.

The method can be carried out both on two-dimensional sample images and on a 3D stack composed of two-dimensional sample images. The method is particularly preferably carried out on sample images which were recorded by means of fluorescence microscopy. However, conventional bright-field microscopy images, too, as is known from the cited prior art, can be processed if they are converted into dark-field images beforehand by inversion. The application can be used in the case of wide-field images, but is also equally possible in the case of images which advantageous by way of confocal scanning, in particular by means of confocal scanning that resolves a diffraction image of the confocal imaging (so-called Airy scan microscopy).

In the iteration process, an improved correction image is calculated in the passes in each case from a current correction image present at the beginning of the respective pass. Said improved correction image then serves as current correction image for the directly following pass. As in any iteration process, the start in the form of a first past differs from the following passes since start conditions have to be set. For this purpose, the recorded sample image is used as current correction image.

In embodiments, the correction image is already the sample image with increased resolution. Alternatively, it is possible for it to be a corresponding two-dimensional arrangement—corresponding to the sample image—of correction factors used to correct the individual image points of the sample image with regard to their intensity.

The invention also encompasses an apparatus and a software program for carrying out the method.

It goes without saying that the features mentioned above and those yet to be explained below can be used not only in the combinations specified but also in other combinations or on their own, without departing from the scope of the present invention.

DESCRIPTION OF THE DRAWINGS

The invention is explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments may also contain alternative elements and components, fewer elements or components, or additional elements or components. Elements or components of different exemplary embodiments may be combined with one another, unless otherwise indicated. Modifications and variations which are described for one of the exemplary embodiments may also be applicable to other exemplary embodiments. In order to avoid repetition, elements that are the same or correspond to one another in different figures are denoted by the same reference signs and are not explained repeatedly. In the figures.

DETAILED DESCRIPTION OF THE INVENTION

Figure 1:
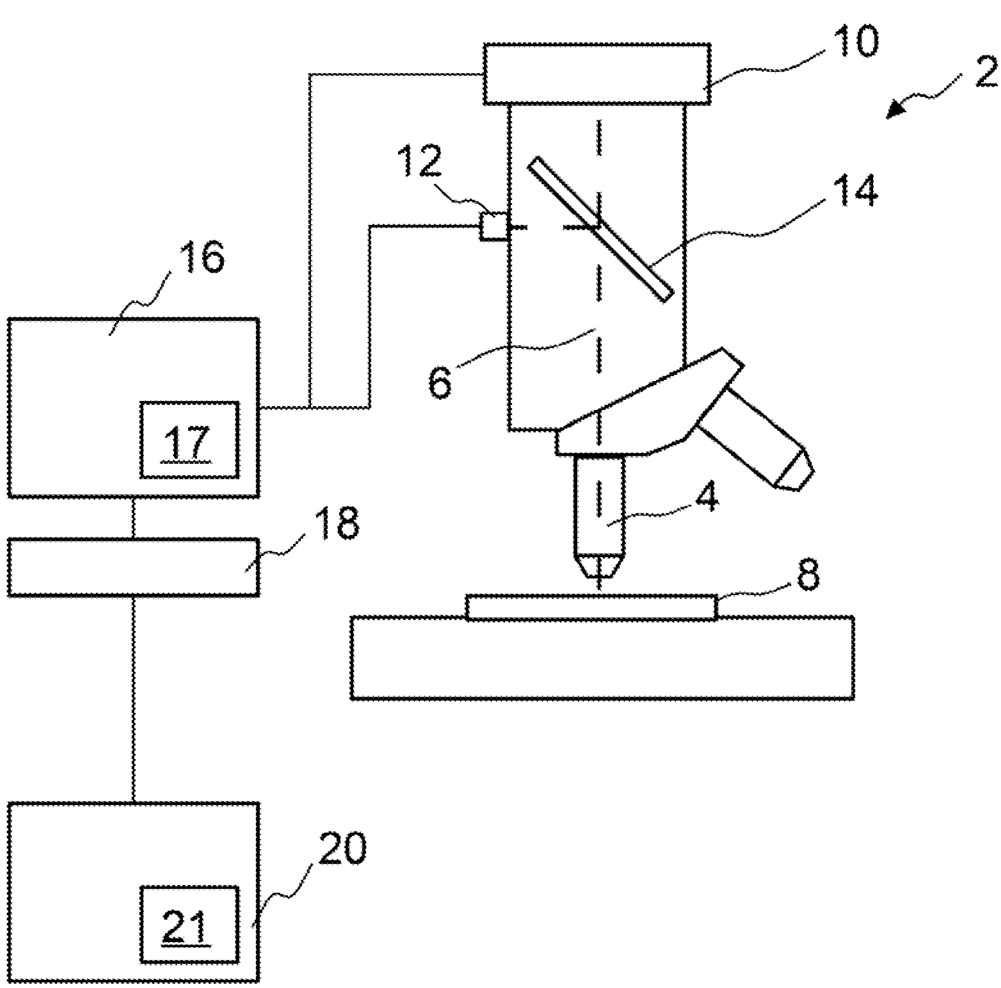
FIG. 1 is a schematic illustration of a system comprising a microscope and an image processing apparatus.

FIG. 1 illustrates a microscope 2, which is embodied as a conventional wide-field fluorescence microscope and images a sample 8 onto a detector 10 through a beam path 6 by means of an objective 4. In this case, fluorescence microscopy is employed in the exemplary embodiment, and so a light source 12 is additionally provided, which, via a beam splitter 14 embodied as a colour splitter, directs illumination radiation onto the sample 8, which acts as excitation radiation there and excites the sample to fluorescence. The fluorescence radiation from the sample 8, red shifted relative to the illumination radiation, can pass through the beam splitter 14 and thus reaches the detector 10. The latter is configured in terms of its number of pixels such that it brings about, in accordance with the Nyquist theorem, at least double oversampling relative to the optical resolution that the microscope 2 comprises, in particular as a result of the objective 4. The detector 10 and the light source 12 are connected via control lines, not designated any further, to a control device 16, which controls the operation of the microscope 2 and in particular receives the image data from the detector 10. For this purpose, the control device 16 has a processor 17 and is connected to an image storage unit 18, in which it stores the recorded sample images supplied by the detector 10.

The image storage unit 18 is furthermore accessed by an image processing apparatus 20, which likewise has a processor, here the processor 21, and which processes the recorded sample images in order to generate sample images with higher resolution, the resolution of which is increased above the measure realized in the recorded sample images. These high-resolution sample images generated by the image processing apparatus 20 under the control of a corresponding computer program have a spatial resolution which is better than the optical resolution which would be realized directly in the signals of the detector 10.

Of course, the image processing apparatus 20 can also be integrated into the control device 16 or be realized by the latter. The case described below with a separate image processing apparatus 20, which together with the microscope 2 forms a microscopy system, has the advantage that the image processing can also be carried out spatially separately from the microscope 2. A realization of the image processing apparatus in the control device 16 or by the control device 16 and the processor 17 thereof has the advantage that the image enhancement can already be carried out during the microscopy process, such that a user can optimally set parameters of the microscopic image recording, for example an illumination intensity, etc.

Insofar as the image processing or image resolution increase is described below, it relates to one of possibly a plurality of fluorescence channels. A microscope 2 which correspondingly excites a plurality of different fluorescence processes in different spectral ranges, the so-called fluorescence channels, in the sample 8 can equally benefit from the image processing described here, which are then carried out in the corresponding fluorescence channels, i.e. for different colours of the recorded sample images that arise in a manner separated in each case individually according to fluorescence channels.

Figure 2:
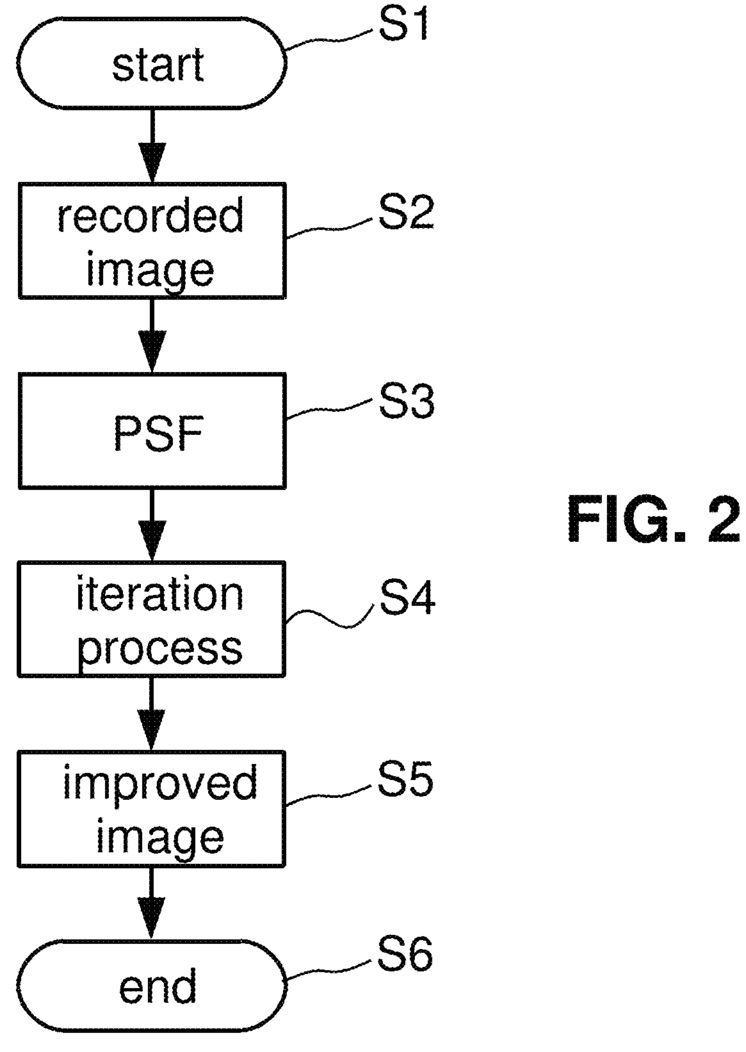
FIG. 2 is a flow diagram for a method for increasing resolution which is carried out by the image processing apparatus from FIG. 1.

FIG. 2 shows a flow diagram for a method for increasing resolution which is carried out by the image processing device 20 (alternatively by the control device 16). In a step S1, the method is started. Afterwards, in a step S2, a recorded sample image which was generated by means of the microscope 2 is provided.

In a step S3, a point spread function characterizing an imaging behaviour of the microscope 2 is provided.

Figure 3:
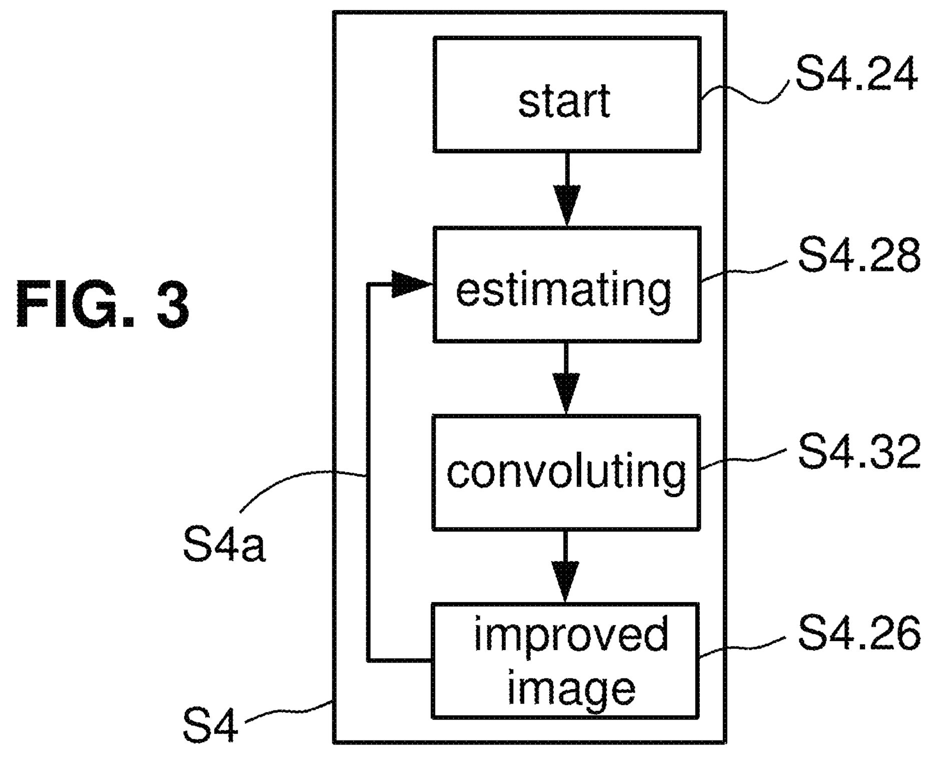
FIG. 3 is a detail view of an iteration loop of the flow diagram from FIG. 2.

Then, in an iteration process S4, a sample image with increased resolution is calculated from the recorded sample image, wherein the iteration process involves repeatedly passing through an iteration loop, which is shown in detail in FIG. 3. After the conclusion of the iteration process S4, a correction image is present, which is stored as a sample image with increased resolution in the image storage unit 18 in step S5. It is already the sample image with increased resolution or constitutes the basis thereof (see above). In step S6, the method is then ended.

The iteration process S4 can be configured in various ways, but what they all have in common is that they comprise a step size factor which is dependent only on the pass number of the respective pass through an iteration loop S4*a* underlying the iteration process S4.

Figure 4:
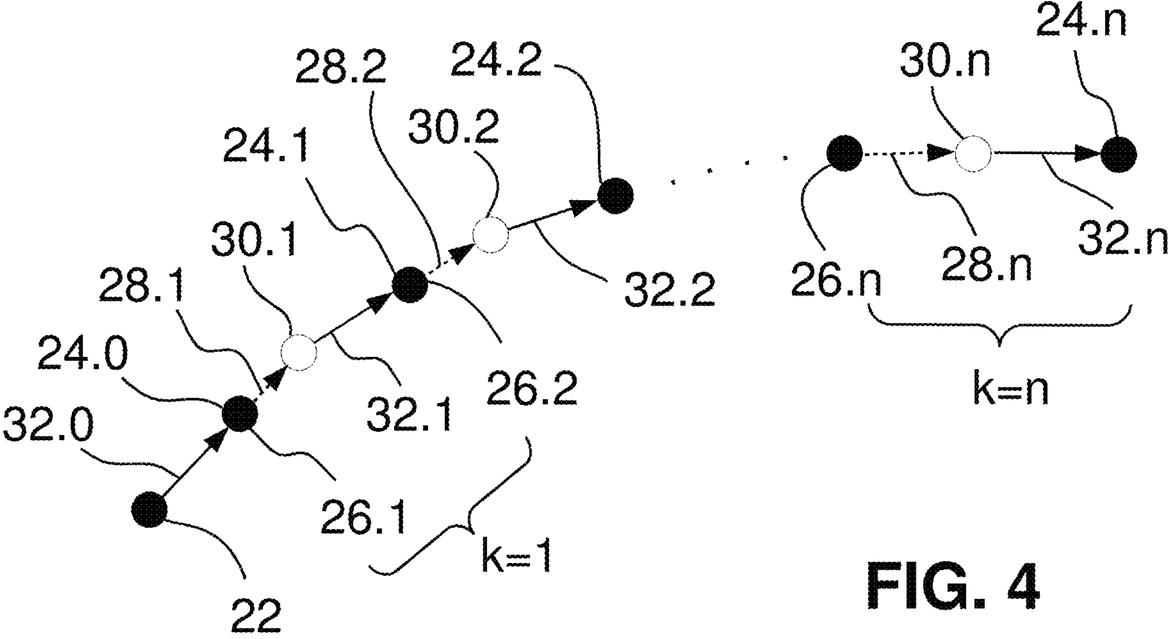
FIG. 4 is a schematic illustration for elucidating the effect of the iteration loop from FIG. 3.

A first embodiment of the iteration process S4 uses the approach described by Biggs and Andrews in the publication cited in the introduction. Said publication is incorporated within its full scope in this regard in this application. The underlying principle here is elucidated in FIG. 4. FIG. 4 schematically shows the change in the intensity of an arbitrary image point during the optimization of the correction image. The illustration in FIG. 4 relates to one image point merely by way of example. The corresponding process is actually carried out for all image points of the image, which justifies the use of the term "correction image".

Filled-in circles in FIG. 4 relate to a correction image calculated e.g. by means of maximum likelihood optimization, and circles not filled in relate to an estimated correction image. Numerals appended with a dot in the reference signs in FIG. 4 relate to a pass number of the iteration loop in FIG. 3, and the numerals appended with a dot in FIG. 3 relate to the corresponding numerals in the reference signs in FIG. 4.

The reference signs in FIG. 3 denote the following here:

S4.24 start step of the iteration step S4;

S4.28 estimation step of a pass through the iteration loop of the iteration step S4;

S4.32 convolution step of a pass, wherein the convolution operation corresponds to that of the start step S4.24;

S4.26 providing an improved correction image which is the result of the previous implementation of step S4.32.

In FIG. 4, as already mentioned, the numerals appended with a dot denote the pass number k. In this case, the reference signs denote the following:

24.*k* an improved correction image obtained by the convolution step S4.32 in the k-th pass;

26.*k* a current correction image at the beginning of the k-th pass through the estimation step S4.28;

28.*k* an arrow for symbolizing the effect of the estimation step S4.28 in the sense of an alteration of the current correction image 26.*k* to form the estimated correction image 30.*k;*

32.*k* an arrow for symbolizing the effect of the convolution step S4.32 in the sense of an alteration towards the improved correction image 26.*k.*

In the iteration process in accordance with the exemplary embodiment in FIGS. 3 and 4, the start step S4.24 having the pass number k=0, proceeding from the recorded sample image 22, calculates an improved correction image 24.0 in a convolution step according to the arrow 32.0. The convolution step uses e.g. the maximum likelihood-based RL algorithm as set out in equation (2) in the publication by Biggs and Andrews. Biggs and Andrews point out that there are also other optimization criteria, e.g. on the basis of entropy maximization or by means of the Gerchberg-Saxton algorithm. Such variants are equally possible here. All that is essential is that the convolution step performs an optimization of the correction image using the PSF. In this case, optimization should be understood to mean the above-mentioned reduction of the difference between the correction image, convolved with the PSF and noisy, and the recorded sample image in accordance with the chosen criterion (e.g. maximum likelihood, entropy, Gerchberg-Saxton algorithm).

The iteration loop S4*a* of the iteration process S4 begins in a next pass (k=1). Here the result of the start pass S4.24, i.e. the improved correction image 24.0, is now used as current correction image 26.1. It is subjected to the estimation step S4.28, which extrapolates, e.g. linearly, the change brought about by the previous convolution step. Said change is illustrated by the direction and length of the arrow 32.0. The estimation step S4.28 thus generates an estimated correction image 30.1.

A step size factor defining an extrapolation range, namely the length of the arrow 28.1, arises here e.g. by means of the formula k/(k+3). It describes the proportion of the change according to arrow 32.0 which is used for extrapolation, and replaces equation (10) from Biggs and Andrews. Here the embodiment thus deviates from the procedure disclosed by Biggs and Andrews, who calculated the step size factor very much more complexly in equation (10) and did not take account of the value of k in the process. In the pass k=1, the step size factor is now one quarter of the range of the previous convolution step.

In accordance with the accelerated RL algorithm, the difference brought about in the last convolution step is multiplied by the step size factor. The step size factor thus does not define by itself the change in the estimation step S.28, but rather a prefactor brought about multiplicatively with the change in the last convolution step in the previous pass.

An improved correction image 24.1 is then calculated from the estimated correction image 30.1 by means of the convolution step S4.32 symbolized as arrow 32.1 in FIG. 4. In terms of the computation operation, the convolution step according to arrow 32.1 corresponds to the convolution step according to arrow 32.0, although owing to the iterative optimization on the basis of other image information (recorded sample image in the case of 32.0, and estimated correction image in the case of 32.1). Both follow the conventional RL algorithm (e.g. equation (2) in the publication by Biggs and Andrews).

The improved correction image 24.1 is then provided in step S4.26, and so it can be used as current correction image 26.2 in the next pass (k=2). The iteration loop S4*a* thus jumps back to step S4.28, which is then carried out for the following pass (k=2). In the latter, in accordance with the schematic illustration in FIG. 4, an estimated correction image 30.2 is now calculated (estimation step S4.28). In accordance with the formula k/(k+3), the step size factor used is now already 0.4. In other words, 40% of the difference brought about by the previous convolution step according to arrow 32.1 is used in the estimation step. On the basis of the estimated correction image 30.2 obtained in this way, an improved correction image 24.2 is now calculated by means of the convolution step S4.32 and is provided in step S4.26, and so it can be read in as current correction image 26.3 in the next pass in step S4.28. This pass then continues. An estimated correction image 30.3 is calculated, and an improved correction image 24.3 is calculated therefrom. The process implements n passes. Termination criteria are known in the prior art.

The step size factor according to arrow 28.1 . . . 28.*n* of the estimation step S4.28 is dependent only on the pass number, as already mentioned. It converges towards one as the pass number rises. Since the step size factor according to equation (6) in the publication by Biggs and Andrews is a prefactor before the difference 32.*k* which was generated during the previous convolution process in accordance with the RL algorithm, as the method proceeds the length of the arrow 28.*k* approximates to the length of the arrow 32.(*k*−1) symbolizing the previous convolution step S4.32.

However, the implementation of the iteration process S4 using a step size factor which defines the extrapolation size e.g. in accordance with Biggs and Andrews is not the only possibility for realization. The iteration process S4 can equally also be implemented in accordance with the conjugate gradient process e.g. from Schaefer et al. Here the calculation of the Hessian matrix in some passes, e.g. every second pass, is replaced by a function which is dependent on the pass number and is multiplied by the last gradient vector length calculated with calculation of the Hessian matrix. The calculation of equation (13) in the publication by Schaefer et al. is thus replaced by a drastically simpler calculation in some of the passes. Said publication is hereby likewise incorporated in terms of contents.

Figure 5:
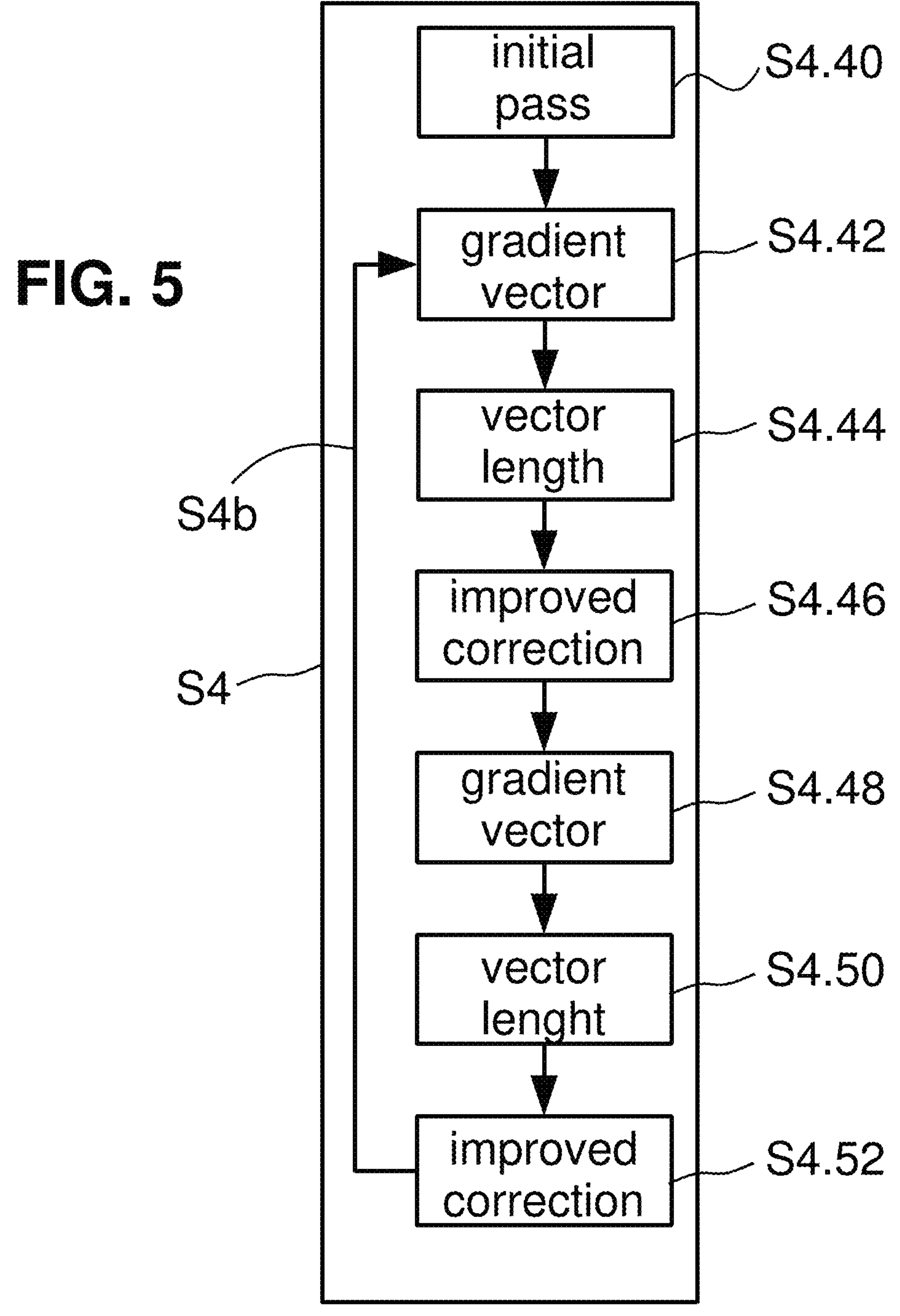
FIG. 5 is a detail view similar to FIG. 3 for other embodiments.

In this respect, FIG. 5 shows a flow diagram of the iteration process S4 from FIG. 2 for a second embodiment. In a start pass in accordance with step S4.40, a first correction image is calculated by the conjugate gradient method. For this purpose, a gradient vector is calculated, which requires two convolution operations with the PSF in the approach in accordance with Schaefer et al., and a gradient vector length is calculated, which requires the calculation of a Hessian matrix and thus two further convolution operations with the PSF in accordance with the system of equations from Schaefer et al. The result of the start step S4.40 is a first correction image. The latter is then improved in an iteration loop S4*b*. For this purpose, firstly once again a gradient vector is calculated in a step S4.42 and a gradient vector length is calculated in step S4.44. Said gradient vector length is again determined with evaluation of the Hessian matrix. In a step S4.46, an improved correction image is calculated from the gradient vector in accordance with step S4.42 and the gradient vector length determined on the basis of the correction image (application of the Hessian matrix calculation).

In step S4.48 that then follows, a gradient vector is again calculated for said improved correction image. In step S4.50, a calculation of a gradient vector length takes place, although now use is made of a step size factor, by which the gradient vector length from step S4.44 is multiplied. In other words, step S4.50 does not involve an evaluation of a correction image in order to determine the gradient vector length. Rather, the gradient vector length which has already been obtained previously on the basis of the correction image is continued by the step size factor. The step size factor is based exclusively on the pass number, i.e. is k-based. It follows a function which simulates as well as possible the change in the gradient vector length in the conjugate gradient method. It is usually a function which converges towards one.

On the basis of this k-based step size factor, the gradient vector length from step S4.44 and the gradient vector from step S4.48, a further improved correction image is then calculated in step S4.52, which image then forms the starting point for the return in the iteration loop S4*b* and is used to calculate the gradient vector in the next pass of step S4.42 and is used to determine the gradient vector length from the correction image in the next implementation of step S4.44.

In the form of illustration in FIG. 5, the step size factor is used in step S4.50 upon every second calculation of a correction image. This 1:1 division is optional, of course. It is equally possible to use, to increase or to decrease other divisions, e.g. 1:2, 1:3 etc. or 2:1, 3:1 etc. or 2:3, 3:2 etc. The schematic diagram in FIG. 5 then changes accordingly.

In a third embodiment, step S4.48, in which a gradient vector is calculated, is replaced by the use of the gradient vector which had been calculated in step S4.42. Then, in steps S4.48 and S4.50, not only is the gradient vector length from step S4.44 continued in a k-based manner, use is also made of the gradient vector from step S4.42, for which the gradient vector length which is now continued had originally been determined. A further shortening of the method is achieved as a result.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. Method for increasing resolution in microscopy, comprising:

providing at least one recorded sample image which was generated by means of a microscope, providing a point spread function which characterizes an imaging behaviour of the microscope, and calculating a sample image with increased resolution from the recorded sample image, wherein the calculating is effected in an iteration process which repeatedly passes through an iteration loop and which determines a correction image from the recorded sample image using the point spread function, wherein a difference between the correction image convolved with the point spread function and the recorded sample image is minimized in the iteration process, and wherein in the iteration process the passes through the iteration loop are numbered with an ascending pass number and each wherein pass through the iteration loop comprise a step size factor, wherein the step size factor is dependent on the pass number of the respective pass, wherein the step size factor is positive and increases with a pass number; and wherein the step size factor is determined without recourse to correction images.

2. Method according to claim 1, wherein the step size factor is chosen in accordance with an always positive function which is dependent on the pass number and which converges towards one as the pass number rises.

3. Method according to claim 2, wherein the function reads k/(k+x), wherein k is the pass number and x is chosen from the interval of one to five.

4. Method according to claim 2, wherein the function contains an exponential function of −k, wherein k is the pass number.

5. Method according to claim 1, wherein the iteration process carries out a conjugate gradient method and the step size factor relates to a gradient vector length calculated in a previous pass.

6. Method according to claim 1, wherein the iteration process executes a Richardson-Lucy algorithm, an improved correction image is determined from a current correction image in each pass, and then serves as current correction image of the next pass, and at least some passes through the iteration loop each comprise a sequence of an estimation step, which calculates an estimated correction image from the current correction image of the respective pass by means of the step size factor, and a convolution step, which calculates the improved correction image of the respective pass from the estimated correction image using the point spread function.

7. Method for increasing resolution according to claim 6, wherein in the estimation step the estimated correction image is calculated by a procedure in which, proceeding from the current correction image of the respective k-th pass, without using the point spread function, a correction image change brought about by the convolution step of the previous (k−1)-th pass is extrapolated, wherein the step size factor defines an extrapolation size of the estimation step.

8. Apparatus for increasing resolution for a recorded sample image recorded by a microscope, wherein the apparatus comprises an image processing device which comprises a processor and is configured for carrying out the method according to claim 1.

9. A non-transitory computer-readable storage medium comprising instructions which, when executed by a computer, cause the computer to carry out the method according to claim 1.

* * * * *